United States Patent
Suzumura et al.

(10) Patent No.: US 9,656,669 B2
(45) Date of Patent: May 23, 2017

(54) CONTROL APPARATUS FOR A VEHICLE PROVIDED WITH A CONTINUOUSLY VARIABLE TRANSMISSION

(71) Applicants: Kyohei Suzumura, Nagoya (JP); Kosuke Kuwada, Toyota (JP); Naoyuki Sakamoto, Nisshin (JP); Shinya Toyoda, Nisshin (JP); Hiroyuki Sawada, Okazaki (JP); Sei Kojima, Kraainem (BE); Lieven Van Houdt, Leuven (BE)

(72) Inventors: Kyohei Suzumura, Nagoya (JP); Kosuke Kuwada, Toyota (JP); Naoyuki Sakamoto, Nisshin (JP); Shinya Toyoda, Nisshin (JP); Hiroyuki Sawada, Okazaki (JP); Sei Kojima, Kraainem (BE); Lieven Van Houdt, Leuven (BE)

(73) Assignees: TOYOTA JIDOSHA KABUSHIKI KAISHA, Toyota (JP); TOYOTA MOTOR EUROPE NV/SA, Brussels (BE)

(*) Notice: Subject to any disclaimer, the term of this patent is extended or adjusted under 35 U.S.C. 154(b) by 0 days.

(21) Appl. No.: 15/134,888

(22) Filed: Apr. 21, 2016

(65) Prior Publication Data

US 2016/0312890 A1    Oct. 27, 2016

(30) Foreign Application Priority Data

Apr. 23, 2015    (JP) .................................. 2015-088836

(51) Int. Cl.
*F16H 59/48*    (2006.01)
*B60W 30/18*    (2012.01)
(Continued)

(52) U.S. Cl.
CPC ............. *B60W 30/18* (2013.01); *F16H 59/48* (2013.01); *B60W 2540/10* (2013.01);
(Continued)

(58) Field of Classification Search
None
See application file for complete search history.

(56) References Cited

U.S. PATENT DOCUMENTS

| 5,532,929 A * | 7/1996 | Hattori | B60K 31/047 |
| | | | 123/361 |
| 2002/0082759 A1* | 6/2002 | Katakura | B60W 10/06 |
| | | | 701/54 |

(Continued)

FOREIGN PATENT DOCUMENTS

| EP | 1650416 A2 | 4/2006 |
| JP | 2006-051842 A | 2/2006 |
| JP | 2006-118388 A | 5/2006 |

*Primary Examiner* — Justin Holmes
(74) *Attorney, Agent, or Firm* — Oliff PLC

(57) ABSTRACT

A control apparatus for a vehicle with a continuously variable transmission, having an acceleration requirement determining portion determining operator required acceleration, a first restricted accelerator operation amount setting portion setting an accelerating member restricted operation amount that increases with a running speed increase, when the determining portion has determined required vehicle acceleration, and a shift control portion controlling the transmission speed ratio on the restricted amount basis, the control apparatus having: a second restricted accelerator operation amount setting portion decreasing the restricted amount from a value immediately prior to an accelerating member rapid releasing action determination moment, at a rate lower than an accelerating member operation actual amount decrease rate after the rapid releasing action determination moment, and an upper limit stop processing portion to limit the restricted amount after a determination (Continued)

moment that the operator requires vehicle acceleration, the restricted amount is not larger than the actual operation amount.

3 Claims, 7 Drawing Sheets

(51) Int. Cl.
    *F16H 59/18*     (2006.01)
    *F16H 59/66*     (2006.01)

(52) U.S. Cl.
    CPC ....... *B60W 2540/106* (2013.01); *F16H 59/18* (2013.01); *F16H 2059/183* (2013.01); *F16H 2059/663* (2013.01)

(56) References Cited

U.S. PATENT DOCUMENTS

| | | | |
|---|---|---|---|
| 2002/0082760 A1* | 6/2002 | Katakura | B60W 10/06 701/54 |
| 2008/0234904 A1* | 9/2008 | Tawara | F16H 61/66259 701/56 |
| 2009/0043468 A1 | 2/2009 | Kondo et al. | |

* cited by examiner

CONTROL APPARATUS FOR A VEHICLE PROVIDED WITH A CONTINUOUSLY VARIABLE TRANSMISSION

CROSS REFERENCE TO RELATED APPLICATION

The present application claims the priority from Japanese Patent Application No. 2015-088836 filed on Apr. 23, 2015, the disclosure of which is herein incorporated by reference in its entirety.

FIELD OF THE INVENTION

The present invention relates in general to a control apparatus for a vehicle provided with a continuously variable transmission, and more particularly to a technique for improving an acceleration performance of the vehicle upon a vehicle accelerating action of a vehicle accelerating member following its releasing action.

BACKGROUND OF THE INVENTION

There is known a vehicle provided with a continuously variable transmission of a mechanical type or an electric type. Examples of the mechanical type continuously variable transmission include: a belt-and-pulley type continuously variable transmission wherein a pair of variable-diameter pulleys effective diameters of which are continuously variable are connected to each other by a transmission belt; and a traction type continuously variable transmission in which a disc is supported between two annular U-grooves formed in opposite surfaces of a pair of cones such that the disc is rotatable about an axis which is pivotable in a plane including axes of rotation of the cones. One example of the electric type continuously variable transmission has a differential gear device including a first rotary element connected to an engine, a second rotary element connected to an electric motor to generate a reaction force corresponding to an output of the engine, and a third rotary element which outputs a vehicle drive force.

In the vehicle provided with such a continuously variable transmission as described above, the output torque of a vehicle drive power source and the speed ratio of the continuously variable transmission are controlled such that the operating state of the vehicle drive power source follows a highest fuel economy line, so that the vehicle can exhibit not only a high degree of fuel economy but also a high degree of drivability. However, controlling the output torque of the vehicle drive power source and the speed ratio of the continuously variable transmission so as to ensure the high degree of fuel economy tend to restrict a target vehicle drive force and the operating speed of the vehicle drive power source with respect to an actual amount of operation of a vehicle accelerating member (e.g., an accelerator pedal) by an operator of the vehicle to accelerate the vehicle, giving rise to a problem of an insufficient degree of acceleration of the vehicle as felt by the vehicle operator.

In view of the problem described above, it has been proposed to temporarily increase the target vehicle drive force, and raise the target rotating speed of an input shaft of the continuously variable transmission, namely, the operating speed of the vehicle drive power source, with respect to an actual amount of operation of the vehicle accelerating member by the vehicle operator to accelerate the vehicle, to ensure a sufficient degree of acceleration of the vehicle as felt by the vehicle operator. For example, Patent Literature 1 proposes a control apparatus configured to control the vehicle provided with a continuously variable transmission, as described above. However, this control technique to improve the acceleration performance of the vehicle as described above suffers from another problem of generation of an initial acceleration shock upon an operation of the vehicle accelerating member to accelerate the vehicle.

On the other hand, Patent Literature 2 proposes a control technique to mitigate initial acceleration and deceleration shocks of the vehicle upon operations of the vehicle accelerating member to accelerate and decelerate the vehicle, by performing a smoothing operation with a second-order delay filter in the form of a filtering portion at a predetermined smoothing ratio, with respect to initial rates of increase and decrease of the actual amount of operation of the vehicle accelerating member by the vehicle operator to accelerate and decelerate the vehicle.

Citation List

Patent Literature 1: JP-2006-051842A
Patent Literature 2: JP-2006-118388A

SUMMARY OF THE INVENTION

Technical Problem

Actually, the vehicle accelerating member may be rapidly operated to accelerate the vehicle immediately after a rapid releasing action of the vehicle accelerating member to its fully released position. In this event, the vehicle operator expects quick acceleration of the vehicle. In the prior art control technique, however, the rates of increase and decrease of the actual amount of operation of the vehicle accelerating member are smoothed, even where the vehicle accelerating member is rapidly operated to accelerate the vehicle immediately after the rapid releasing action of the vehicle accelerating member to its fully released position, resulting in a considerable difference of the actual degree of acceleration of the vehicle from the degree expected by the vehicle operator, and a risk of delay of the vehicle acceleration as felt by the vehicle operator.

The present invention was made in view of the background art described above. It is therefore an object of the present invention to provide a control apparatus for a vehicle provided with a continuously variable transmission, which control apparatus prevents a difference of the actual degree of acceleration of the vehicle from the degree expected by the vehicle operator, and a delay of the vehicle acceleration as felt by the vehicle operator, upon a rapid operation of a vehicle accelerating member to accelerate the vehicle immediately after its rapid releasing action.

Solution to Problem

The object indicated above is achieved according to the principle of the present invention, which provides a control apparatus for a vehicle provided with a continuously variable transmission, comprising an acceleration requirement determining portion configured to determine whether an operator of the vehicle requires acceleration of the vehicle, on the basis of an actual amount of operation of a vehicle accelerating member, that is, an accelerator pedal by the operator, a first restricted accelerator operation amount setting portion configured to set a restricted amount of operation of the vehicle accelerating member such that the restricted amount gradually increases with an increase of a running speed of the vehicle, when the acceleration requirement determining portion has determined that the operator of the vehicle requires the acceleration of the vehicle, and a shift control portion configured to control a speed ratio of the continuously variable transmission on the basis of the restricted amount of operation of the vehicle accelerating member, the control apparatus further comprising a second restricted accelerator operation amount setting portion configured to decrease the restricted amount of operation of the vehicle accelerating member from a value immediately prior to a moment of determination of a rapid releasing action of the vehicle accelerating member, at a rate lower than a rate of decrease of the actual amount of operation of the vehicle accelerating member after the moment of determination of the rapid releasing action, and an upper limit stop processing portion configured to limit the restricted amount of operation of the vehicle accelerating member after a moment of the determination that the operator of the vehicle requires the acceleration of the vehicle, such that the restricted amount of operation is not larger than the actual amount of operation.

Advantageous Effects of Invention

In the control apparatus of the present invention described above, the second restricted accelerator operation amount setting portion is configured to decrease the restricted amount of operation of the vehicle accelerating member from the value immediately prior to the moment of determination of the rapid releasing action, at the rate lower than the rate of decrease of the actual amount of operation of the vehicle accelerating member after the moment of determination of the rapid releasing action, and the upper limit stop processing portion is configured to limit the restricted amount of operation of the vehicle accelerating member after the moment of the determination that the operator of the vehicle requires the acceleration of the vehicle, such that the restricted amount of operation is not larger than the actual amount of operation. Accordingly, the speed ratio of the continuously variable transmission is controlled on the basis of the restricted accelerator operation amount the limitation of which is cancelled by a rapid increase of the actual accelerator operation amount following the rapid releasing action of the vehicle accelerating member. Thus, the speed ratio of the continuously variable transmission is controlled on the basis of the restricted accelerator operation amount which rapidly increases together with the rapid increase of the actual accelerator operation amount, until the actual accelerator operation amount exceeds the restricted accelerator operation amount provided as the lower limit, as a result of the rapid increase of the actual accelerator operation amount upon the vehicle accelerating action of the vehicle accelerating member immediately after the rapid releasing action, so that the vehicle drive force is rapidly increased after the vehicle accelerating action of the vehicle accelerating member. Namely, the engine torque is rapidly increased after the rapid vehicle accelerating action of the vehicle accelerating member, and a risk of delay of the vehicle acceleration as felt by the vehicle operator is reduced.

In one preferred form of the present invention, the rate of decrease of the restricted amount of operation of the vehicle accelerating member from the value immediately prior to the rapid releasing action is set as a function of a running speed or weight of the vehicle or a gradient of a roadway surface on which the vehicle is running, so as to decrease with an increase of the running speed or weight of the vehicle or the gradient of the roadway surface. Accordingly, the rate of decrease of the restricted amount of operation of the vehicle accelerating member is set so as to decrease with the increase of the vehicle running speed or weight or the roadway surface gradient. Therefore, at a point of time at which the limitation of the restricted amount of operation of the vehicle accelerating member to a value not larger than the actual amount of operation is cancelled as a result of a rapid vehicle accelerating action of the vehicle accelerating member following its rapid releasing action, the restricted accelerator operation amount is larger than the actual amount of operation by an amount which increases with the increase of the vehicle running speed or weight or the roadway surface gradient. Accordingly, the risk of delay of the vehicle acceleration as felt by the vehicle operator is effectively reduced.

In a further preferred form of the invention, the control apparatus receives an output signal of an accelerator pedal operation amount sensor for detecting an actual amount of operation of an accelerator pedal provided as the vehicle accelerating member.

DETAILED DESCRIPTION OF PREFERRED EMBODIMENT

Figure 1:
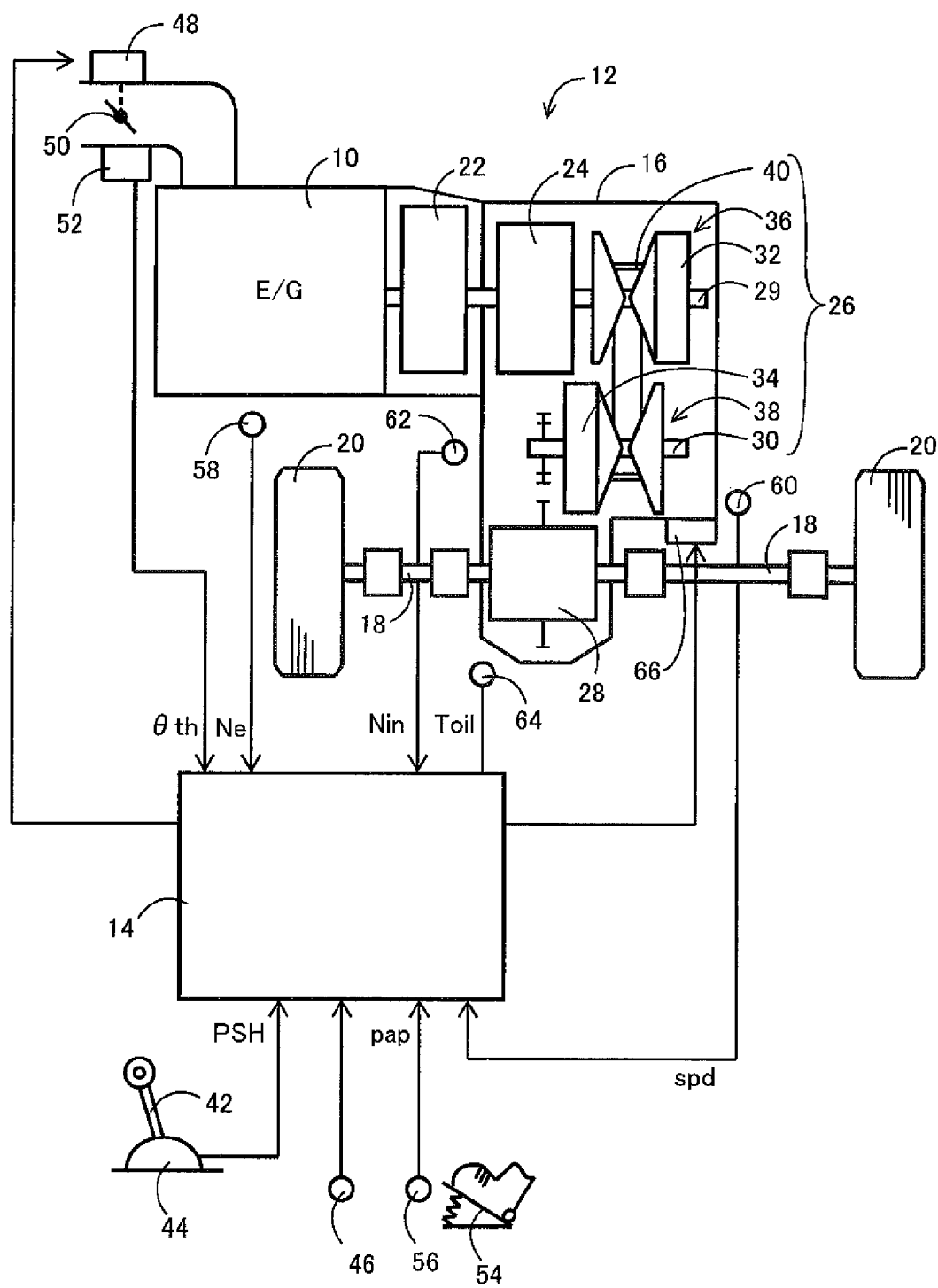
FIG. 1 is a schematic view showing an arrangement of a vehicle to be controlled by a control apparatus according to the present invention.

Referring to the drawings, preferred embodiments of the present invention will be described in detail.

FIRST EMBODIMENT

Referring first to the schematic view of FIG. 1 showing major parts of a vehicle to be controlled by a control apparatus according to the present invention, the vehicle includes an internal combustion engine 10, a power transmitting system 12, and an electronic control device 14 serving as the control apparatus according to the invention. The power transmitting system 12 is provided with a transaxle 16 connected to the engine 10, a pair of axles 18 rotated by the engine 10 through the transaxle 16. The pair of axles 18 are respectively connected to a pair of drive wheels 20, so that a vehicle drive force generated by the engine 10 is transmitted to the drive wheels 20.

The transaxle 16 accommodates a torque converter 22, a forward/reverse switching device 24, a continuously variable transmission 26, and a final speed reduction device 28 (in the form of a differential gear device). The torque converter 22 has a damper provided to damp a variation of a torque or a rotary motion received from the engine 10, and to transmit the thus smoothed torque or rotary motion to the forward/reverse switching device 24. The continuously variable transmission 26 has an input shaft 29, and an output shaft 30, and is constructed to continuously change its speed ratio γ (=Nin/Nout) which is a ratio of a rotating speed Nin of the input shaft 29 to a rotating speed Nout of the output shaft 30.

In the present embodiment, the continuously variable transmission 26 is a belt-and-pulley type continuously variable transmission including a pair of variable-diameter pulleys 36 and 38, and a transmission belt 40 connecting these pulleys 36 and 38 to each other. The pulleys 36 and 38 are mounted on the respective input and output shafts 29 and 30 disposed in parallel to each other, such that effective diameters of the pulleys 36 and 38 are variable by respective hydraulic actuators 32 and 34. The speed ratio γ of the continuously variable transmission 26 is changed by controlling the hydraulic actuators 32 and 34 so as to change the effective diameters of the pulleys 36 and 38 in the mutually opposite directions.

As shown in FIG. 1, the electronic control device 14 is configured to receive various input signals such as an output signal of a shift position sensor 44 indicative of a presently selected shift position PSH of a shift lever 42; an output signal of an ignition switch 46 indicative of an ON/OFF state of an ignition key; an output signal of a throttle valve opening angle sensor 52 indicative of an opening angle θth (%) of a throttle valve 50 operated by a throttle actuator 48; an output signal of an accelerator operation amount sensor 56 indicative of an operation amount pap (%) of a vehicle accelerating member in the form of an accelerator pedal 54, that is, indicative of an engine output required by an operator of the vehicle; an output signal of an engine speed sensor 58 indicative of an operating speed Ne (rpm) of the engine 10; an output signal of a vehicle speed sensor 60 indicative of a running speed spd (km/h) of the vehicle corresponding to the rotating speed Nout of the output shaft 30 (hereinafter referred to as "output shaft speed Nout"); an output signal of an input shaft speed sensor 62 indicative of the rotating speed Nin (rpm) of the input shaft 29 (hereinafter referred to as "input shaft speed Nin"); and an output signal of an oil temperature sensor 64 indicative of a temperature Toil (° C.) of a working fluid in a hydraulic system in the transaxle 16 accommodating the continuously variable transmission 26.

The electronic control device 14 is a so-called microcomputer incorporating a CPU, a ROM, a RAM and an input-output interface. The electronic control device 14 performs control operations to process various input signals, according to control programs stored in the ROM, while utilizing a temporary data storage function of the RAM, in particular, a control operation to set a target value Nint of the input shaft speed Nin of the continuously variable transmission 26, so as to reduce a delay of the actual vehicle acceleration upon a depressing action of the accelerator pedal 54 immediately after a rapid releasing action of the accelerator pedal 54, while ensuring a linear increase of the vehicle acceleration value upon an operation of the accelerator pedal 54 by a relatively small amount. The electronic control device 14 is further configured to control a shift control valve 66 of the continuously variable transmission 26 so as to establish the thus set target value Nint of the input shaft speed Nin.

Figure 2:
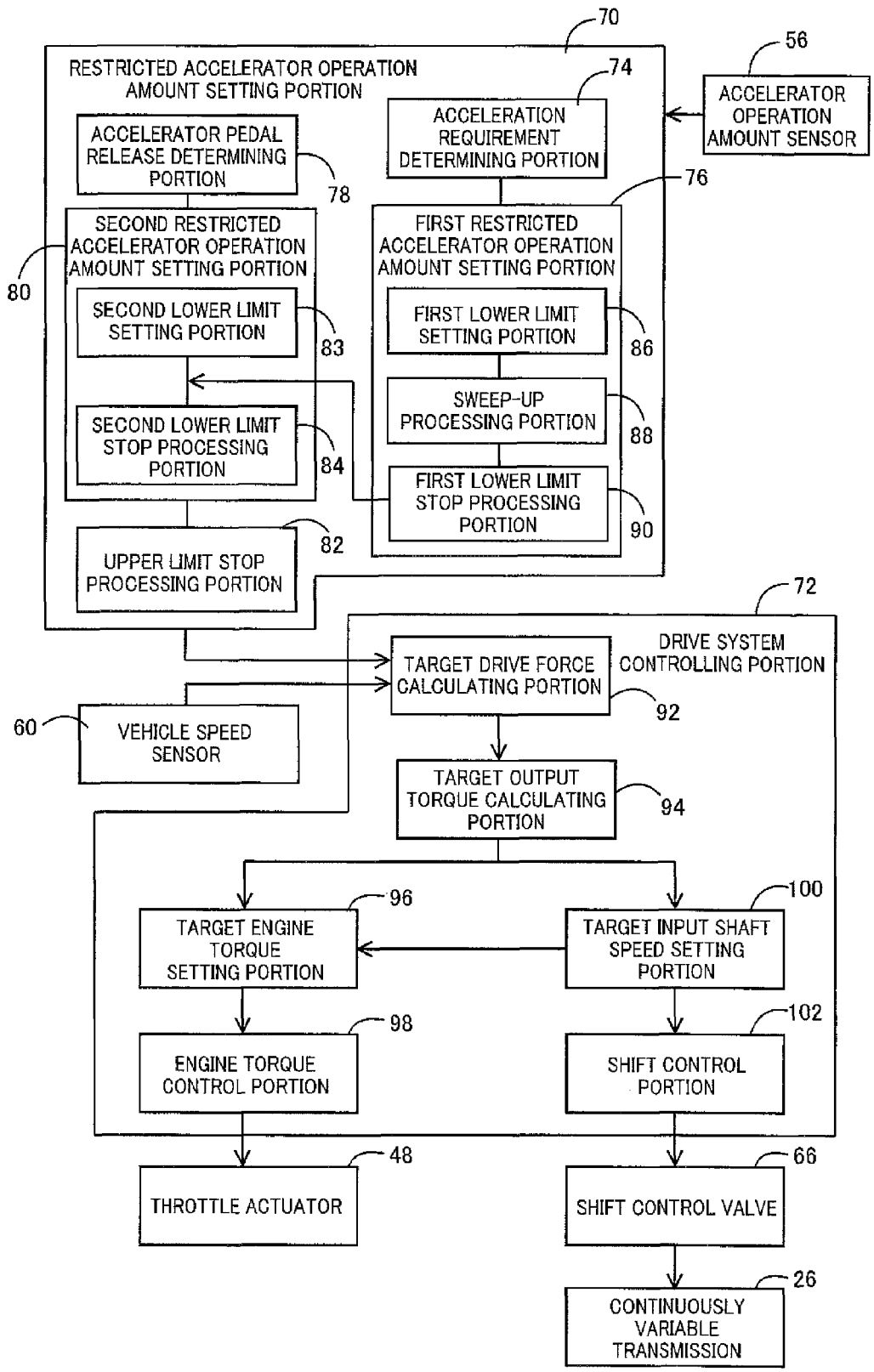
FIG. 2 is a functional block diagram illustrating major control portions of an electronic control device shown in FIG. 1.

Referring next to the functional block diagram of FIG. 2 showing the major control portions of the electronic control device 14 to control the vehicle drive force and the speed ratio γ of the continuously variable transmission 26, the electronic control device 14 includes a restricted accelerator operation amount setting portion 70, and a drive system controlling portion 72. The restricted accelerator operation amount setting portion 70 is configured to process an actual accelerator operation amount accpfb represented by the output signal pap of the accelerator operation amount sensor 56. The drive system controlling portion 72 is configured to control a drive force of the vehicle on the basis of a restricted accelerator operation amount accpfctrl generated by the restricted accelerator operation amount setting portion 70.

The restricted accelerator operation amount setting portion 70 includes an acceleration requirement determining portion 74, a first restricted accelerator operation amount setting portion 76, an accelerator pedal release determining portion 78, a second restricted accelerator operation amount setting portion 80, and an upper limit stop processing portion 82. The second restricted accelerator operation amount setting portion 80 includes a second lower limit setting portion 83, and a second lower limit stop processing portion 84.

The acceleration requirement determining portion 74 is configured to determine that the vehicle operator requires acceleration of the vehicle, when an amount and a rate of increase of the actual accelerator operation amount accpfb have exceeded respective predetermined threshold values. These threshold values are determined in advance by experimentation, to detect or determine a comparatively rapid depressing action of the accelerator pedal 54 when the amount and rate of increase of the actual accelerator operation amount accpfb exceed the determined threshold values. The first restricted accelerator operation amount setting portion 76 is configured to perform a smoothing operation such as a first-order or second-order delaying operation at a predetermined smoothing ratio with respect to the rate of increase of the actual accelerator operation amount accpfb, to generate the restricted accelerator operation amount accpfctrl, when the acceleration requirement determining portion 74 has determined that the vehicle operator requires acceleration of the vehicle. The generated restricted accelerator operation amount accpfctrl is used to control the engine 10 and the continuously variable transmission 26 through the drive system controlling portion 72, so that the rate of increase of the restricted accelerator operation amount accpfctrl is lower than the rate of increase of the actual accelerator operation amount accpfb, whereby the initial acceleration shock upon acceleration of the vehicle can be mitigated.

The first restricted accelerator operation amount setting portion 76 includes a first lower limit setting portion 86, a sweep-up processing portion 88 and a first lower limit stop processing portion 90. The first lower limit setting portion 86 is configured to set a lower limit of an amount of damping or decrease of the accelerator operation amount, that is, calculate a first lower limit value accpflogrd, according to the following equation (1), by subtracting a predetermined value from the actual accelerator operation amount accpfb. The sweep-up processing portion 88 is configured to repeatedly calculate the restricted accelerator operation amount value accpfctrl $_{(i)}$ in the present control cycle, according to the following equation (2), by adding a predetermined increment value $\Delta$accpfctrl to the restricted accelerator operation amount value accpfctrl $_{(i-1)}$ in the last control cycle, so that the restricted accelerator operation amount accpfctrl is linearly increased. The first lower limit stop processing portion 90 is configured to stop the sweep-up processing operation of the sweep-up processing portion 88, according to the following equation (3), for preventing a decrease of the restricted accelerator operation amount accpfctrl below the first lower limit value accpflogrd, namely, for preventing the decrease of the restricted accelerator operation amount accpfctrl from the actual accelerator operation amount accpfb by more than the predetermined value described above with respect to the first lower limit setting portion 86.

$$\text{accpflogrd} = \text{accpfb} - \text{predetermined value} \quad (1)$$

$$\text{accpfctrl}_{(i)} = \text{accpfctrl}_{(i-1)} + \text{predetermined increment value } \Delta\text{accpfctrl} \quad (2)$$

$$\text{accpflogrd} \leq \text{accpfctrl} \quad (3)$$

The accelerator pedal release determining portion 78 is configured to determine that the vehicle operator has rapidly released the accelerator pedal 54, when an amount and a rate of decrease of the actual accelerator operation amount accpfb have exceeded respective predetermined threshold values. These threshold values are determined in advance by experimentation, to detect or determine a comparatively rapid releasing action of the accelerator pedal 54 when the amount and rate of decrease of the actual accelerator operation amount accpfb exceed the determined threshold values. The second lower limit setting portion 83 of the second restricted accelerator operation amount setting portion 80 is configured to repeatedly hold the restricted accelerator operation amount accpfctrl $_{(i-1)}$ in the last control cycle, namely, the actual accelerator operation amount accpfb in the last control cycle, as an attenuated accelerator operation amount accpfdec, according to the following equation (4), until the accelerator pedal release determining portion 78 has determined that the vehicle operator has rapidly released the accelerator pedal 54. After the accelerator pedal release determining portion 78 has determined that the vehicle operator has rapidly released the accelerator pedal 54, the second lower limit setting portion 83 performs a sweep-down processing operation to subtract a predetermined decrement value $\Delta$accpfdec from the attenuated accelerator operation amount value accpfdec $_{(i-1)}$ in the last control cycle, for thereby repeatedly calculating the attenuated accelerator operation amount accpfdec $_{(i)}$ in the present control cycle, so that the attenuated accelerator operation amount accpfdec used as a second lower limit value is linearly decreased. The above-indicated predetermined decrement value $\Delta$accpfdec is an amount of decrease in each control cycle, which therefore represents a rate of decrease of the attenuated accelerator operation amount accpfdec. The decrement value $\Delta$accpfdec is set as a function of the vehicle running speed spd or weight, or a gradient of a roadway surface on which the vehicle is running. Namely, the decrement value $\Delta$accpfdec is set so as to decrease with an increase of the vehicle running speed spd or weight or the roadway surface gradient. The second lower limit stop processing portion 84 of the second restricted accelerator operation amount setting portion 80 is configured to perform a lower limit processing operation for stopping the sweep-down processing operation of the second lower limit setting portion 83, according to the following equation (5), for preventing a decrease of the restricted accelerator operation amount accpfctrl during the sweep-down processing operation of the second lower limit setting portion 83 below the attenuated accelerator operation amount accpfdec. Thus, the second restricted accelerator operation amount setting portion 80 including the second lower limit setting portion 83 and the second lower limit stop processing portion 84 functions to decrease the restricted accelerator operation amount accpfctrl at a rate lower than the rate of decrease of the actual accelerator operation amount accpfb, which rate of decrease is generally high after the accelerator pedal release determining portion 78 has determined that the vehicle operator has rapidly released the accelerator pedal 54. The upper limit stop processing portion 82 is configured to prevent an increase of the restricted accelerator operation amount accpfctrl above the actual accelerator operation amount accpfb, according to the following equation (6), so that the restricted accelerator operation amount accpfctrl is linearly decreased down to the actual accelerator pedal operation amount accpfb, at the rate lower than the rate of decrease of the actual accelerator operation amount accpfb, during the releasing action of the accelerator pedal 54.

$$\text{accpfctrl}_{(i)} = \text{accpfctrl}_{(i-1)} - \Delta\text{accpfctrl} \quad (4)$$

$$\text{accpfdec} \leq \text{accpfctrl} \quad (5)$$

$$\text{accpfctrl} \leq \text{accpfb} \quad (6)$$

The drive system controlling portion 72 includes a target drive force calculating portion 92, a target output torque calculating portion 94, a target engine torque setting portion 96, an engine torque control portion 98, a target input shaft speed setting portion 100 and a shift control portion 102.

The target drive force calculating portion 92 is configured to repeatedly calculate a target (required) vehicle drive force FORCEDCL during a normal running, an accelerating running (which may take place following a releasing action of the accelerator pedal 54) or a decelerating running of the vehicle, on the basis of the actual vehicle running speed spd and the restricted accelerator operation amount accpfctrl, and according to a predetermined and stored relationship between the target vehicle drive force FORCEDCL and the vehicle running speed spd and restricted accelerator operation amount accpfctrl. The target output torque calculating portion 94 is configured to repeatedly calculate a target output POWER by multiplying the calculated target vehicle drive force FORCEDCL by the vehicle running speed spd. The target engine torque setting portion 96 is configured to repeatedly calculate a target torque TE of the engine 10 by dividing the target output POWER calculated by the target output torque calculating portion 94 by the present operating speed Ne of the engine 10 or a target input shaft speed Nint calculated by the target input shaft speed setting portion 100. The engine torque control portion 98 is configured to repeatedly control the throttle actuator 48 for controlling the opening angle θth of the throttle valve 50, so as to establish the calculated target engine torque TE.

The target input shaft speed setting portion 100 is configured to repeatedly calculate the target input shaft speed Nint on the basis of the actual vehicle running speed spd and the restricted accelerator operation amount accpfctrl, and according to a predetermined and stored relationship between the target input shaft speed Nint and the vehicle running speed spd and restricted accelerator operation amount accpfctrl. The shift control portion 102 is configured to repeatedly control the shift control valve 66 such that the actual input shaft speed Nin coincides with the calculated target input shaft speed Nint, namely, to repeatedly control the rate of flow of the working fluid into the hydraulic actuator 32 of the input side variable-diameter pulley 36 or from the hydraulic actuator 32, for thereby controlling the speed ratio γ of the belt-and-pulley type continuously variable transmission 26. For instance, the shift control portion 102 controls the speed ratio γ of the continuously variable transmission 26 according to a PI feedback control equation, such that the input shaft speed Nin coincides with the target value Nint i.e., a difference e (=Nint−Nin) is decreased. Since the target input shaft speed Nint is calculated on the basis of the restricted accelerator operation amount accpfctrl, the shift control portion 102 controls the speed ratio γ of the continuously variable transmission 26 on the basis of the restricted accelerator operation amount accpfctrl.

Figure 3:
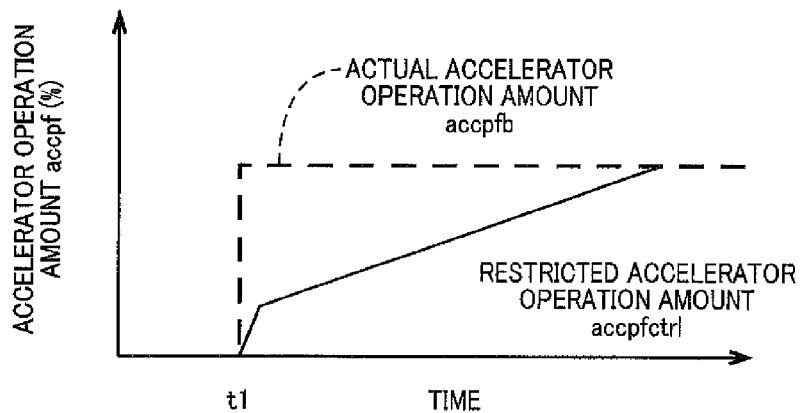
FIG. 3 is a time chart indicating an increase of a restricted accelerator operation amount (represented by a solid line) as compared with a change of an actual accelerator operation amount (represented by a broken line), for explaining a function of a first restricted accelerator operation amount setting portion of the electronic control device shown in FIG. 2, to set the restricted accelerator operation amount upon an operation of an accelerator pedal to accelerate the vehicle.
Figure 4:
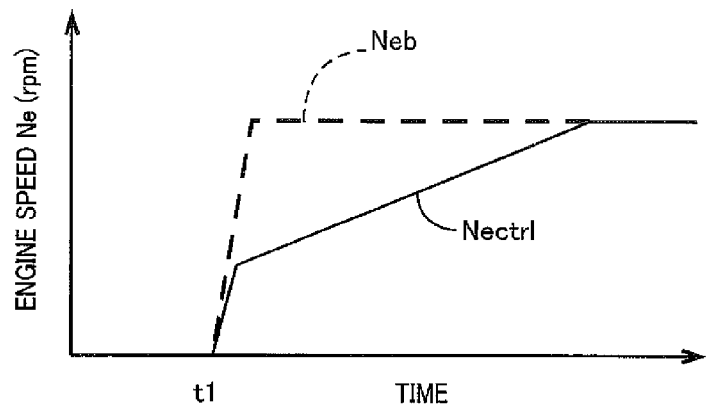
FIG. 4 is a time chart indicating an engine operating speed (represented by a solid line) to be controlled on the basis of the restricted accelerator operation amount indicated in FIG. 3, as compared with an engine operating speed (represented by a broken line) to be controlled on the basis of the actual accelerator operation amount also indicated in FIG. 3.
Figure 5:
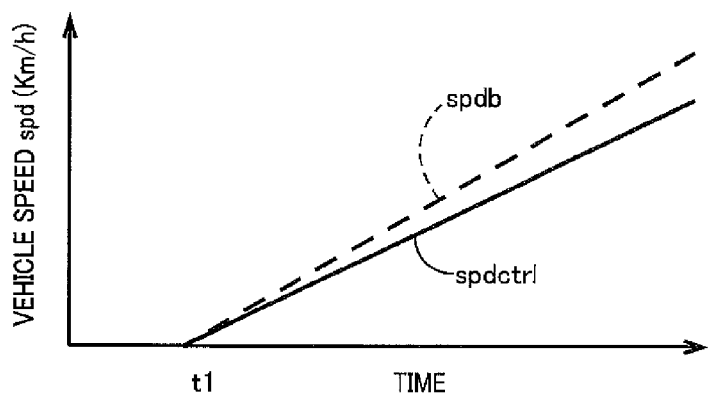
FIG. 5 is a time chart indicating a vehicle running speed (represented by a solid line) to be established according to the restricted accelerator operation amount indicated in FIG. 3, as compared with a vehicle running speed (represented by a broken line) to be established according to the actual accelerator operation amount also indicated in FIG. 3.

In the time chart of FIG. 3, the broken and solid lines respectively represent changes of the actual accelerator operation amount accpfb and the restricted accelerator operation amount accpfctrl, in comparison with each other, when the acceleration request of the operator of the vehicle is determined by the acceleration requirement determining portion 74. In the example of the time chart of FIG. 3 wherein the actual accelerator operation amount accpfb is rapidly increased at an extremely high rate at a point of time t1, the restricted accelerator operation amount setting portion 76 linearly increases the restricted accelerator operation amount accpfctrl at a rate lower than the rate of increase of the actual accelerator operation amount accpfb, for mitigating the initial vehicle acceleration shock. In the time chart of FIG. 4, the broken line represents a change of an actual engine speed Neb to be controlled on the basis of the actual accelerator operation amount accpfb, while the solid line represents a change of an engine speed Nectrl to be controlled on the basis of the restricted accelerator operation amount accpfctrl, when the acceleration requirement determining portion 74 has determined that the vehicle operator requires acceleration of the vehicle. In the example of the time chart of FIG. 4 wherein the engine speed Neb to be controlled on the basis of the actual accelerator operation amount accpfb is rapidly raised at a high rate in a short length of time from a point of time t1, the drive system controlling portion 72 controls the engine speed Nectrl controlled on the basis of the restricted accelerator operation amount accpfctrl such that the engine speed Nectrl is raised at a rate lower than the rate of rise of the engine speed Neb in a comparatively long length of time from the point of time t1. In the time chart of FIG. 5, the broken line represents a change of a vehicle running speed spdb when the vehicle is driven by the drive force to be controlled by the drive system controlling portion 72 on the basis of the actual accelerator operation amount accpfb, while the solid line represents a change of a vehicle running speed spdctrl when the vehicle is driven by the drive force to be controlled by the drive system controlling portion 72 on the basis of the restricted accelerator operation amount accpfctrl, when the acceleration requirement determining portion 74 has determined that the vehicle operator requires acceleration of the vehicle. In the example of the time chart of FIG. 5, the running speed spdctrl of the vehicle driven by the drive force to be controlled by the drive system controlling portion 72 on the basis of the restricted accelerator operation amount accpfctrl is raised at a rate lower than a rate of rise of the running speed spdb of the vehicle to be driven by the drive force to be controlled by the drive system controlling portion 72 on the basis of the actual accelerator operation amount accpfb.

Figure 6:
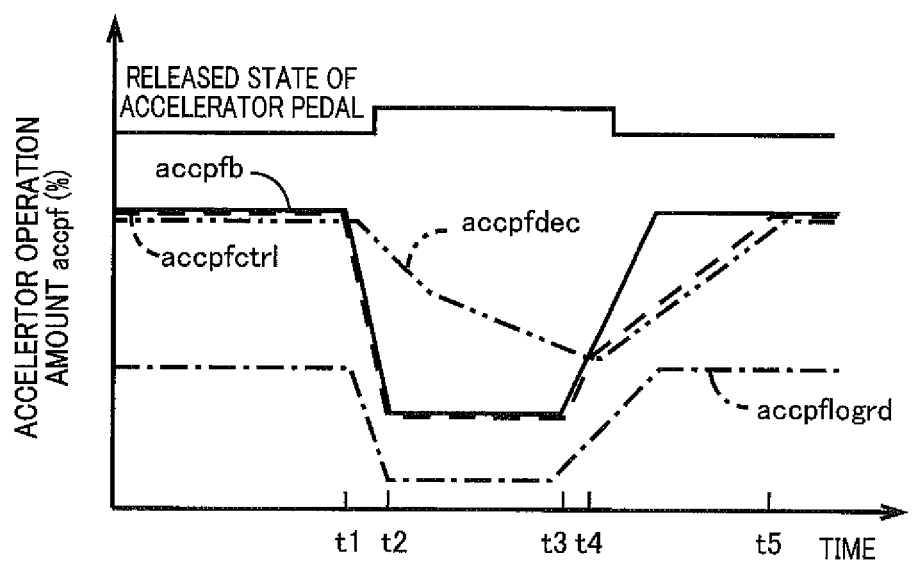
FIG. 6 is a time chart indicating changes of the restricted accelerator operation amount and an attenuated accelerator operation amount respectively set by the first restricted accelerator operation amount setting portion and a second restricted accelerator operation amount setting portion shown in FIG. 2, after a rapid releasing action of the accelerator pedal, as compared with the actual accelerator operation amount.

FIG. 6 is the time chart indicating changes of the restricted accelerator operation amount accpfctrl and the attenuated accelerator operation amount accpfdec respectively set by the first and second restricted accelerator operation amount setting portions 76 and 80, the actual accelerator operation amount accpfb, and the first lower limit value accpflogrd when the accelerator pedal 54 is rapidly depressed immediately after a rapid releasing action of the accelerator pedal 54. In the example of the time chart of FIG. 6, the vehicle is run in a steady state up to a point of time t1. In this steady running of the vehicle, the actual accelerator operation amount accpfb represented by a solid line, the restricted accelerator operation amount accpfctrl represented by a broken line, and the attenuated accelerator operation amount accpfdec represented by a two dotted line are all kept constant at the same value, while the first lower limit value accpflogrd is kept constant at a value which is smaller than the actual accelerator operation amount accpfb by the predetermined value. In response to the rapid releasing action of the accelerator pedal 54 at the point of time t1, the actual accelerator operation amount accpfb represented by the solid line is rapidly decreased, while the restricted accelerator operation amount accpfctrl also represented by the broken line is rapidly decreased to the same value as the actual accelerator operation amount accpfb, under a limiting operation of the upper limit stop processing portion 82. Then, the actual and restricted accelerator operation amounts accpfb and accpfctrl are kept at this value up to a point of time t4 at which the accelerator pedal 54 is depressed again. After the rapid releasing action of the accelerator pedal 54, the attenuated accelerator operation amount accpfdec is decreased by a sweep-down processing operation of the second lower limit stop processing portion 84, from the restricted accelerator operation amount accpfctrl immediately prior to the rapid releasing action, at a rate lower than the rate of decrease of the actual accelerator operation amount accpfb. However, during a period of time from the point of time t1 to the point of time t4 in which the accelerator pedal 54 is kept in the released state and the attenuated accelerator operation amount accpfdec functions as the lower limit (second lower limit) of the restricted accelerator operation amount accpfctrl, under a limiting operation of the upper limit stop processing portion 82, the restricted accelerator operation amount accpfctrl is kept ineffective up to the point of time t4 at which the actual accelerator operation amount accpfb rapidly increases to a value larger than the attenuated accelerator operation amount accpfdec, as a result of the subsequent depressing action of the accelerator pedal 54.

After the point of time t4 at which the actual accelerator operation amount accpfb rapidly increases and exceeds the attenuated accelerator operation amount accpfdec as a result of the depressing action of the accelerator pedal 54, the restricted accelerator operation amount accpfctrl, the lower limit of which is set at the attenuated accelerator operation amount accpfdec in the absence of the limiting operation of the upper limit stop processing portion 82, is increased at a rate lower than the rate of increase of the actual accelerator operation amount accpfb, under a sweep-up processing operation of the first restricted accelerator operation amount setting portion 76, and the vehicle is brought into a steady running state at a point of time t5. During a period of time from a point of time t3 at which the accelerator pedal 54 is depressed again, to the point of time t4 at which the actual accelerator operation amount accpfb exceeds the attenuated accelerator operation amount accpfdec, the restricted accelerator operation amount accpfctrl is rapidly increased together with the actual accelerator operation amount accpfb, making it possible to prevent or reduce a difference of the output torque of the engine 10 from the value expected by the vehicle operator, and a risk of delay of the vehicle acceleration as felt by the vehicle operator when the accelerator operation amount is increased again after once decreased.

The above-indicated point of time t4 is represented by a point of intersection between the line representing the change of the actual accelerator operation amount accpfb and the line representing the change of the attenuated accelerator operation amount accpfdec. This point of time t4 is delayed with a decrease of a gradient of the line representing the attenuated accelerator operation amount accpfdec, so that the period of time between the points of time t3 and t4 in which the actual and attenuated accelerator operation amounts accpfb and accpfdec are rapidly increased is accordingly elongated. The decrement value $\Delta accpfdec$ defining the gradient of the line representing the attenuated accelerator operation amount accpfdec is set as a function of the vehicle running speed spd or weight or the roadway surface gradient, such that the decrement value $\Delta accpfdec$ decreases with an increase of the vehicle running speed spd or weight or the roadway surface gradient, so that the period of time between the points of time t3 and t4 in which the actual and attenuated accelerator operation amounts accpfb and accpfdec are rapidly increased is increased with the increase of the vehicle running speed spd or weight or the roadway surface gradient, making it possible to prevent or reduce the difference of the output torque of the engine 10 from the value expected by the vehicle operator, and the risk of delay of the vehicle acceleration as felt by the vehicle operator when the accelerator operation amount is increased again after once decreased, irrespective of the vehicle running speed spd or weight or the roadway surface gradient.

Figure 7:
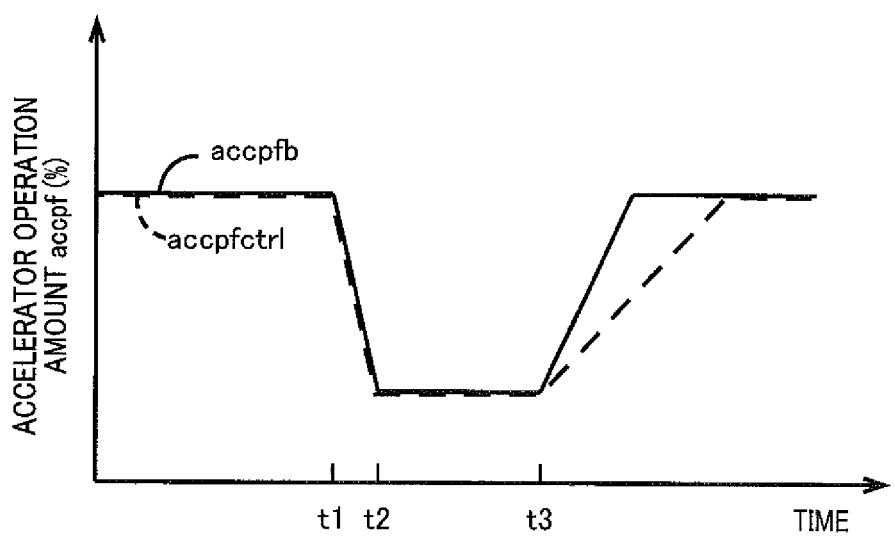
FIG. 7 is a time chart indicating a change of the restricted accelerator operation amount set by the first restricted accelerator operation amount setting portion also shown in FIG. 2, and the actual accelerator operation amount, after the rapid releasing action of the accelerator pedal.

The time chart of FIG. 7 indicates a change of the restricted accelerator operation amount accpfctrl set by the first restricted accelerator operation amount setting portion 76, and the actual accelerator operation amount accpfb, when the accelerator pedal 54 is depressed after a rapid releasing action of the accelerator pedal 54, where the second restricted accelerator operation amount setting portion 80 according to the present invention is not provided, namely, in the absence of the second lower limit stop processing portion 84 configured to perform the sweep-down processing operation for decreasing the attenuated accelerator operation amount accpfdec from the restricted accelerator operation amount accpfctrl $_{(i-1)}$ in the last control cycle immediately prior to the rapid releasing action of the accelerator pedal 54, at a rate lower than the rate of decrease of the actual accelerator operation amount accpfb, to set the thus decreased attenuated accelerator operation amount accpfdec as the lower limit of the restricted accelerator operation amount accpfctrl. Accordingly, the restricted accelerator operation amount accpfctrl is increased by the first restricted accelerator operation amount setting portion 76, at a rate lower than the rate of increase of the actual accelerator operation amount accpfb, as indicated in FIG. 3, in response to a rapid increase of the actual accelerator operation amount accpfb upon the depressing action of the accelerator pedal 54 at the point of time t3, resulting in a considerable difference of the engine output torque from the value expected by the vehicle operator, and a risk of delay of the vehicle acceleration as felt by the vehicle operator during the vehicle is being accelerated.

Figure 8:
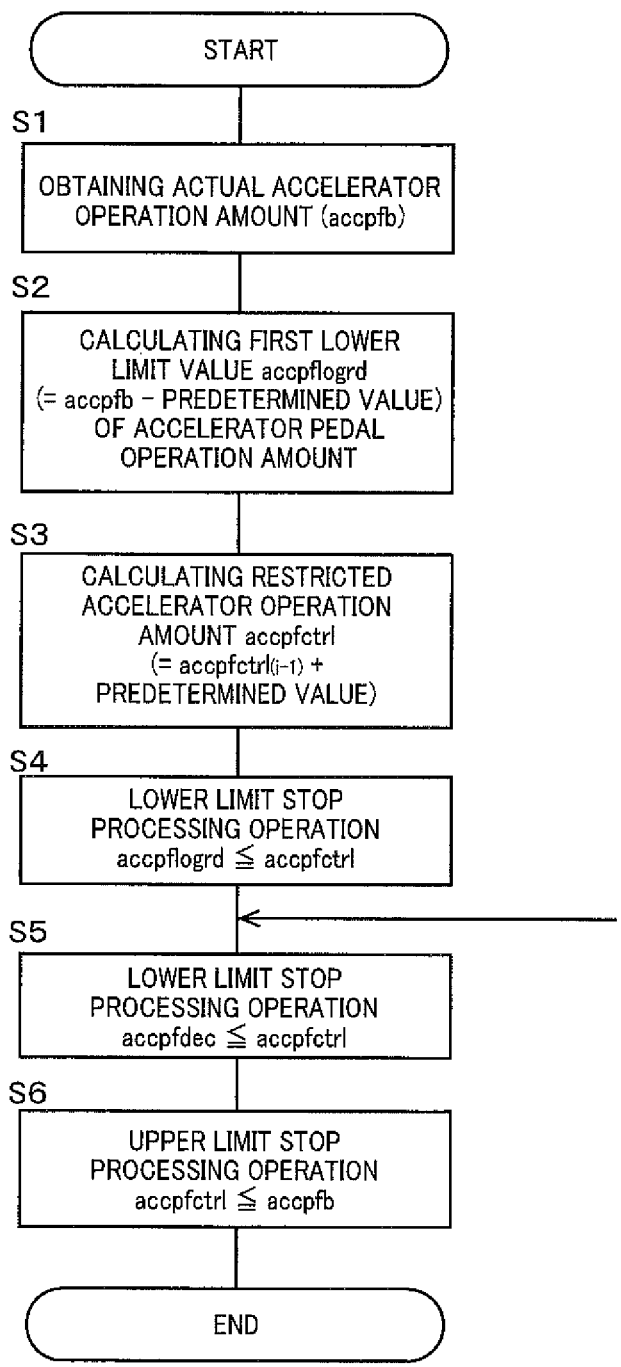
FIG. 8 is a flow chart illustrating an essential part of a main control routine executed by the electronic control device shown in FIG. 1, according to one embodiment of this invention.

The flow chart of FIG. 8 illustrates an essential part of a main control routine executed by the electronic control device 14. The main control routine of FIG. 8 is initiated with a step S1 to obtain the actual accelerator operation amount accpfb on the basis of the accelerator operation amount sensor 56 indicative of the operation amount pap (%) of the accelerator pedal 54. Then, the control flow goes to a step S2 corresponding to the acceleration requirement determining portion 74, to make the determination as to whether the vehicle operator requires acceleration of the vehicle. This determination is made depending upon whether the rate of increase of the actual accelerator operation amount accpfb has exceeded the predetermined value. In this step S2 also corresponding to the first lower limit setting portion 86, the first lower limit value accpflogrd for decreased value of the operation amount pap of the accelerator pedal 54 corresponding to the actual accelerator operation amount accpfb is calculated according to the above-indicated equation (1) such that the first lower limit value accpflogrd is smaller than the actual accelerator operation amount accpfb by the predetermined value or ratio.

The control flow then goes to a step S3 corresponding to the sweep-up processing portion 88, to perform the sweep-up processing operation for repeatedly calculating the restricted accelerator operation amount accpfctrl according to the above-indicated equation (2), such that the restricted accelerator operation amount accpfctrl is linearly increased from the value which is smaller than the actual accelerator operation amount accpfb. The restricted accelerator operation amount accpfctrl is a control command value of the operation amount pap of the accelerator pedal 54, which is used to control the engine 10 and the continuously variable transmission 26. According to the equation (2), the predetermined increment value $\Delta accpfctrl$ is added in each control cycle to the restricted accelerator operation amount accpfctrl $_{(i-1)}$ in the last control cycle.

Then, the control flow goes to a step S4 corresponding to the first lower limit stop processing portion 90, to perform the lower limit stop processing operation according to the above-indicated equation (3) on the basis of the first lower limit value accpflogrd, for preventing a decrease of the restricted accelerator operation amount accpfctrl below the first lower limit value accpflogrd obtained in S2.

The control flow then goes to a step S5 corresponding to the second lower limit stop processing portion 84, to perform the lower limit stop processing operation according to the above-indicated equation (5), after the sweep-down processing operation to repeatedly decrease the attenuated accelerator operation amount accpfdec after the releasing action of the accelerator pedal 54, for preventing a decrease of the restricted accelerator operation amount accpfctrl below the attenuated accelerator operation amount accpfdec (lower limit value). Namely, one of the attenuated accelerator operation amount accpfdec (lower limit value) and the restricted accelerator operation amount accpfctrl which is larger than the other is used to determine the target input shaft speed Nint.

Then, the control flow goes to a step S6 corresponding to the upper limit stop processing portion 82, to perform the upper limit stop processing operation according to the above-indicated equation (6), for preventing an increase of the restricted accelerator operation amount accpfctrl from exceeding the upper limit, that is, the actual accelerator operation amount accpfb. Since this step S6 is implemented as the last step in the main control routine, the upper limit stop processing operation is predominant over the lower limit stop processing operations in the steps S4 and S5.

Figure 9:
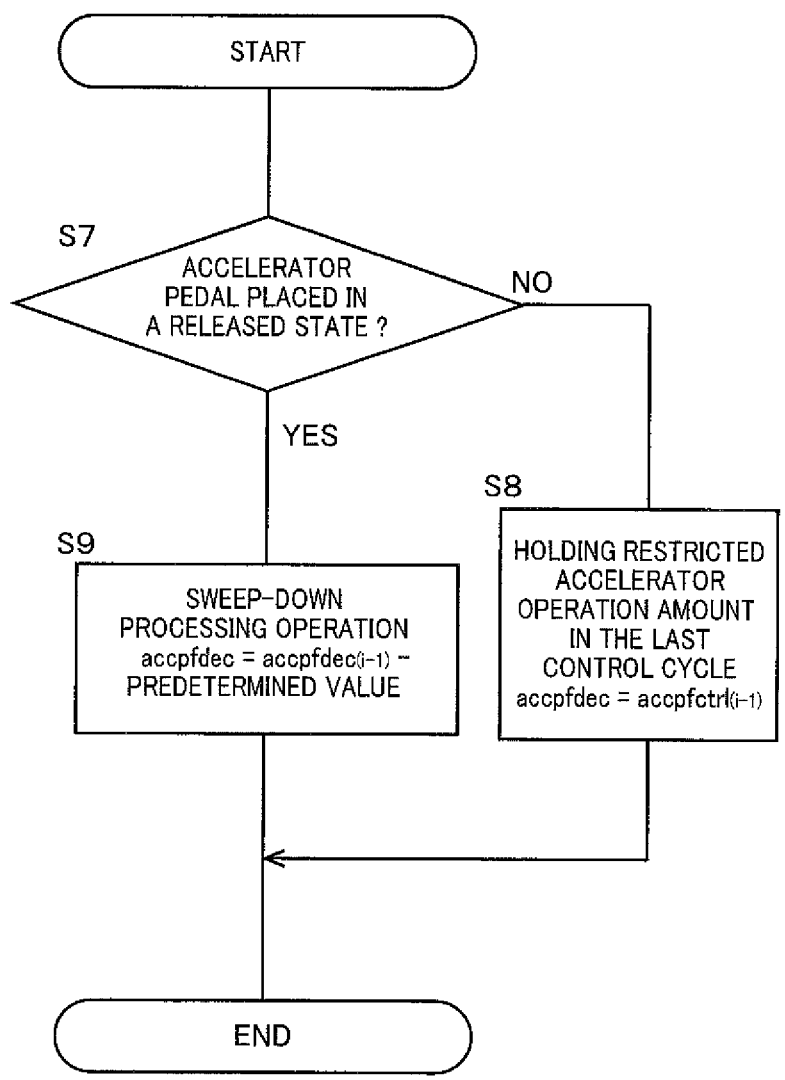
FIG. 9 is a flow chart illustrating an essential part of a subroutine executed by the electronic control device during execution of the main control routine of FIG. 8.

While the above-described steps S1-S4 and S6 in the present embodiment are also implemented in the prior art, the present embodiment is different from the prior art in that the step S5, and steps S7-S9 of a subroutine described below by reference to the flow chart of FIG. 9 are additionally implemented in the present embodiment. In the subroutine of FIG. 9, the step S7 corresponding to the accelerator pedal release determining portion 78 is implemented to make the determination as to whether the vehicle operator has rapidly released the accelerator pedal 54. For instance, this determination is made depending upon whether the actual accelerator operation amount accpfb is smaller than a predetermined threshold value. If a negative determination is obtained in the step S7, the control flow goes to the step S8 to hold the restricted accelerator operation amount $_{(i-1)}$ in the last control cycle, as an initial value of the attenuated accelerator operation amount accpfdec. If an affirmative determination is obtained in the step S7, the control flow goes to the step S9 corresponding to the second lower limit setting portion 83, to perform the sweep-down processing operation for repeatedly decrementing the attenuated accelerator operation amount accpfdec in each control cycle, according to the above-indicated equation (4), by subtracting the predetermined decrement value Δaccpfdec from the value accpfdec $_{(i-1)}$ held in the step S8 in the last control cycle. The predetermined decrement value Δaccpfdec is determined so that the attenuated accelerator operation amount accpfdec is decreased at a rate lower than the rate of decrease of the actual accelerator operation amount accpfb. The steps S8 and S9 are followed after the step S5 of FIG. 8. The attenuated accelerator operation amount accpfdec decremented as described above is used in the step S5 and the following steps of FIG. 8.

According to the electronic control device 14 provided in the present embodiment, the second restricted accelerator operation amount setting portion 80 is configured to decrement the attenuated accelerator operation amount accpfdec used as the lower limit of the restricted accelerator operation amount accpfctrl, from the restricted accelerator operation amount accpfctrl $_{(i-1)}$ immediately prior to the rapid releasing action of the accelerator pedal 54, at the rate lower than the rate of decrease of the actual accelerator operation amount accpfb after the moment of determination of the rapid releasing action of the accelerator pedal 54, and the upper limit stop processing portion 82 is configured to limit the restricted operation amount accpfctrl of the accelerator pedal 54 after the moment of the determination that the vehicle operator requires the acceleration of the vehicle, such that the restricted accelerator operation amount accpfctrl is not larger than the actual accelerator operation amount accpfb. Accordingly, the speed ratio of the continuously variable transmission 26 is controlled by the drive system controlling portion 72 on the basis of the restricted accelerator operation amount accpfctrl the limitation of which is cancelled by a rapid increase of the actual accelerator operation amount accpfb upon a rapid depressing action of the accelerator pedal 54 following the rapid releasing action of the accelerator pedal 54. Thus, the speed ratio of the continuously variable transmission 26 is controlled on the basis of the restricted accelerator operation amount accpfctrl which rapidly increases together with a rapid increase of the actual accelerator operation amount accpfb, until the actual accelerator operation amount accpfb exceeds the attenuated accelerator operation amount accpfdec provided as the lower limit of the restricted accelerator operation amount accpfctrl, as a result of increase of the actual accelerator operation amount accpfb upon a rapid depressing action of the accelerator pedal 54 immediately after the rapid releasing action, so that the vehicle drive force is rapidly increased after the depressing action of the accelerator pedal 54. Namely, the engine torque is rapidly increased after the rapid depressing action of the accelerator pedal 54, and the risk of delay of the vehicle acceleration as felt by the vehicle operator is reduced.

The electronic control device 14 is further configured such that the rate of decrease of the attenuated accelerator operation amount accpfdec is used as the lower limit of the restricted accelerator operation amount accpfctrl so that the restricted accelerator operation amount accpfctrl decreases from the value accpfctrl $_{(i-1)}$ immediately prior to the rapid releasing action of the accelerator pedal 54, at a rate lower than the rate of decrease of the actual accelerator operation amount accpfb after the moment of the rapid releasing action of the accelerator pedal 54. This rate of decrease of the attenuated accelerator operation amount accpfdec is set as a function of the vehicle running speed spd or weight or the roadway surface gradient, so as to decrease with an increase of the vehicle running speed spd or weight or the roadway surface gradient. Accordingly, the rate of decrease of the restricted accelerator operation amount accpfctrl is set so as to decrease with the increase of the vehicle running speed spd or weight or the roadway surface gradient. Therefore, at the point of time t4 at which the limitation of the restricted accelerator operation amount accpfctrl to a value not larger than the actual accelerator operation amount accpfb is cancelled as a result of a rapid depressing action of the accelerator pedal 54 following its rapid releasing action, the restricted accelerator operation amount accpfctrl is larger than the actual accelerator operation amount accpfb by an amount which increases with the increase of the vehicle running speed spd or weight or the roadway surface gradient. Accordingly, the risk of delay of the vehicle acceleration as felt by the vehicle operator is effectively reduced after the rapid depressing action of the accelerator pedal 54.

SECOND EMBODIMENT

Figure 10:
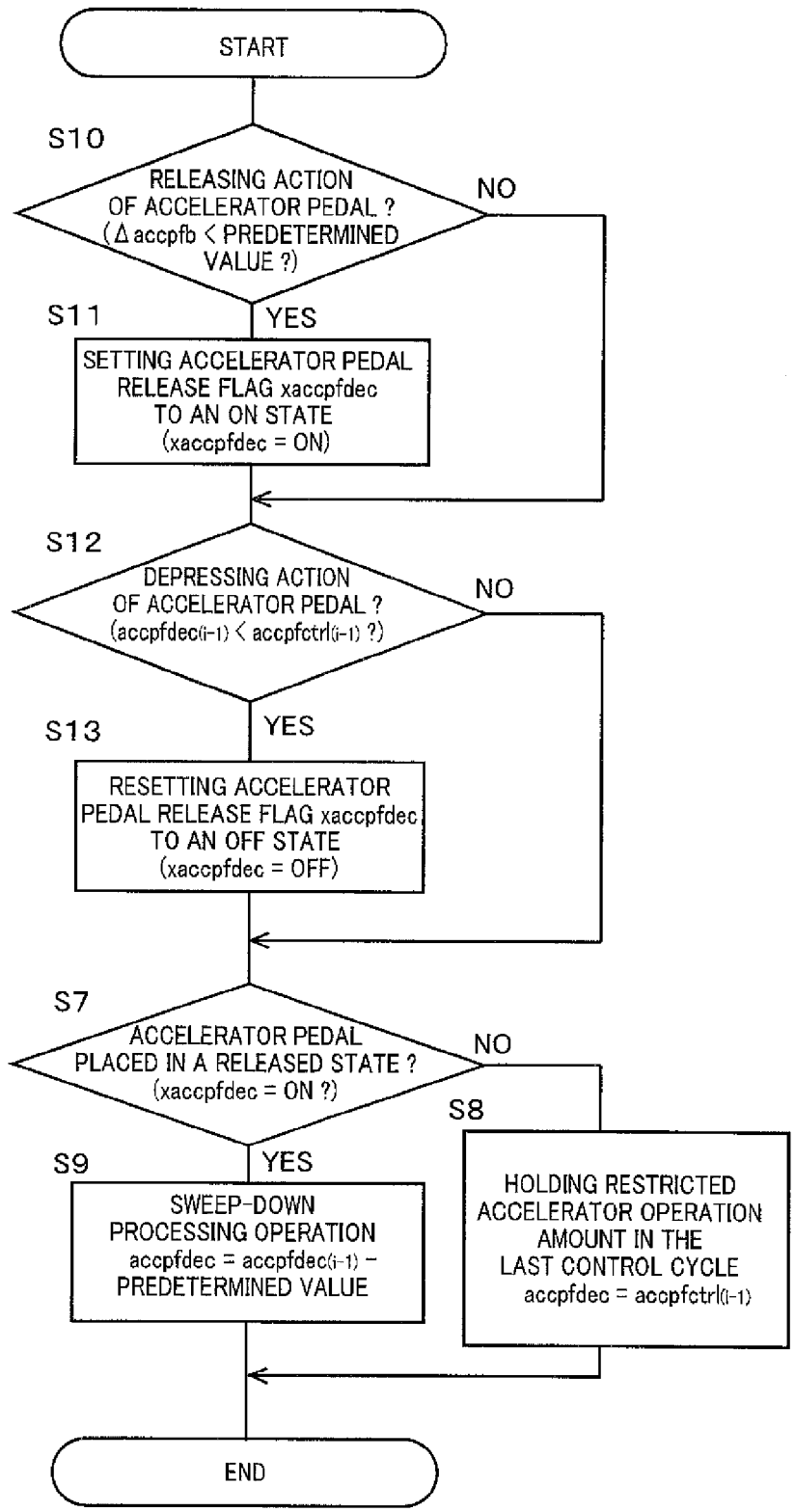
FIG. 10 is a flow chart corresponding to that of FIG. 9, illustrating an essential part of a subroutine executed by the electronic control device according to another embodiment of this invention.

The flow chart of FIG. 10 illustrates a control operation of the electronic control device 14 according to another embodiment of this invention, namely, a subroutine in which steps S10-S13 are implemented in addition to the steps S7-S9 in the subroutine of FIG. 9 according to the preceding embodiment of FIG. 8. In FIG. 10, the same steps as in the embodiment of FIG. 8 are identified by the same step numbers as used in FIG. 9, and will not described redundantly.

The subroutine of FIG. 10 is initiated with a step S10 to determine whether the vehicle operator has rapidly released the accelerator pedal 54. This determination is made depending upon whether an amount of decrease Δaccpfb of the accelerator pedal 54 is smaller than a predetermined value. If a negative determination is obtained in the step S10, the control flow goes to a step S12 while skipping a step S11. If an affirmative determination is obtained in the step S10, the control flow goes to the step S11 to set an accelerator pedal release flag xaccpfdec to an ON state. Then, the control flow goes to the step S12 to determine whether the vehicle operator has depressed the accelerator pedal 54. This determination is made depending upon whether the attenuated accelerator operation amount accpfdec $_{(i-1)}$ in the last control cycle is smaller than the restricted accelerator operation amount accpfctrl $_{(i-1)}$ in the last control cycle. If a negative determination is obtained in the step S12, the control flow goes to the step S7 while skipping a step S13. If an affirmative determination is obtained in the step S12, the control flow goes to the step S13 to reset the accelerator pedal release flag xaccpfdec to an OFF state. Then, the control flow goes to the step S7 to determine whether the accelerator pedal 54 is placed in the released state. This determination is made depending upon whether the accelerator pedal release flag xaccpfdec is in the ON state. If a negative determination is obtained in the step S7, the control flow goes to the step S8 to hold the restricted accelerator operation amount accpfctrl $_{(i-1)}$ in the last control cycle, as the attenuated accelerator operation amount accpfdec. If an affirmative determination is obtained in the step S7, the control flow goes to the step S9 to set the attenuated accelerator operation amount accpfdec such that the attenuated accelerator operation amount accpfdec decreases at a rate lower than the rate of decrease of the actual accelerator operation amount accpfb. The attenuated accelerator operation amount accpfdec decremented as described above is used in the step S5 and the following steps of FIG. 8.

While the preferred embodiments of this invention have been described in detail by reference to the drawings, it is to be understood that the invention may be otherwise embodied.

In the vehicle provided with the continuously variable transmission 26 in the illustrated embodiments, the output torque of the engine 10 and the speed ratio γ of the continuously variable transmission 26 are controlled by a so-called "drive-force demand type" control implemented by the drive system controlling portion 72. However, the drive system controlling portion 72 may be replaced by a drive system controlling portion configured to determine the target input shaft speed Nint on the basis of the vehicle running speed spd and the opening angle θth of the throttle valve 50, and according to a predetermined relationship between the vehicle running speed spd and the target input shaft speed Nint, with the accelerator operation amount used as a control parameter. This relationship is represented by a two-dimensional coordinate system in which the vehicle running speed spd and the target input shaft speed Nint are taken along the respective two axes.

In the illustrated embodiments, the continuously variable transmission 26 is the so-called "belt-and-pulley" type continuously variable transmission. However, this continuously variable transmission may be replaced by a so-called "traction type" continuously variable transmission in which a roller is supported between a pair of cones disposed rotatably relative to each other about a common axis such that the roller is rotatable about an axis which is pivotable in a plane including axes of rotation of the cones.

In the illustrated embodiments, the continuously variable transmission 26 is the so-called "belt-and-pulley type" continuously variable transmission. However, the continuously variable transmission 26 may be replaced by an electrically controlled continuously variable transmission which has a differential gear device including a first rotary element (input shaft) connected to an engine, a second rotary element connected to a first motor/generator, and a third rotary element connected to drive wheels through a power transmitting shaft (output shaft), and which further has a second motor/generator connected to the power transmitting shaft, and wherein the first motor/generator which generates a reaction force corresponding to an output of the engine is controlled to control the speed ratio of the continuously variable transmission.

It is to be understood that the embodiments and modifications described above are given for illustrative purpose only, and that the present invention may be embodied with various other changes and improvements which may occur to those skilled in the art.

NOMENCLATURE OF REFERENCE SIGNS

10: Engine
14: Electronic control device
26: Continuously variable transmission
54: Accelerator pedal
70: Restricted accelerator operation amount setting portion
72: Drive system controlling portion
76: First restricted accelerator operation amount setting portion
80: Second restricted accelerator operation amount setting portion
102: Shift control portion

The invention claimed is:

1. A control apparatus for a vehicle provided with a continuously variable transmission, comprising an acceleration requirement determining portion configured to determine whether an operator of the vehicle requires acceleration of the vehicle, on the basis of an actual amount of operation of a vehicle accelerating member by the operator, a first restricted accelerator operation amount setting portion configured to set a restricted amount of operation of the vehicle accelerating member such that the restricted amount increases with an increase of a running speed of the vehicle, when the acceleration requirement determining portion has determined that the operator of the vehicle requires the acceleration of the vehicle, and a shift control portion configured to control a speed ratio of the continuously variable transmission on the basis of the restricted amount of operation of the vehicle accelerating member, said control apparatus further comprising:

a second restricted accelerator operation amount setting portion configured to decrease the restricted amount of operation of the vehicle accelerating member from a value immediately prior to a moment of determination of a releasing action of the vehicle accelerating member, at a rate lower than a rate of decrease of the actual amount of operation of the vehicle accelerating member after the moment of determination of the rapid releasing action, and an upper limit stop processing portion configured to limit the restricted amount of operation of the vehicle accelerating member after a moment of the determination that the operator of the vehicle requires the acceleration of the vehicle, such that the restricted amount of operation is not larger than the actual amount of operation.

2. The control apparatus according to claim 1, wherein the rate of decrease of the restricted amount of operation of the vehicle accelerating member from the value immediately prior to the releasing action is set as a function of a running speed or weight of the vehicle or a gradient of a roadway surface on which the vehicle is running, so as to decrease with an increase of the running speed or weight of the vehicle or the gradient of the roadway surface.

3. The control apparatus according to claim 1, which is configured to receive an output signal of an accelerator pedal operation amount sensor for detecting an actual amount of operation of an accelerator pedal provided as the vehicle accelerating member.

* * * * *